MOUNTING DEVICE FOR MAGNETIC TRANSDUCING HEAD

Filed Dec. 2, 1964

INVENTOR.
KARL J. ZIMMER
BY Carl Fissell Jr.
AGENT

United States Patent Office 3,368,210
Patented Feb. 6, 1968

3,368,210

MOUNTING DEVICE FOR MAGNETIC TRANSDUCING HEAD

Karl J. Zimmer, Malvern, Pa., assignor to Burroughs Corporation, Detroit, Mich., a corporation of Michigan Filed Dec. 2, 1964, Ser. No. 415,340
12 Claims. (Cl. 340—174.1)

ABSTRACT OF THE DISCLOSURE

The present invention relates to a novel suspension system for aerodynamically supporting an electromagnetic transducer for air bearing "flying" movement adjacent a movable record medium. The suspension system includes a pair of thin, elongated, flexible members demountably fixed at one end to an adjustable support member and demountably attached at their opposite remote ends to the transducer in a manner permitting limited and constrained rock and roll gimbal-like movement of the transducer about two mutual perpendicular axes adjacent the record medium.

The present invention relates to suspension systems for electromagnetic transducers and, more particularly, although not necessarily exclusively, to a novel suspension system for mounting one or more recorder-reproducers adjacent a rotatable magnetizable record drum or disc and to the novel means for semi-rigidly yet flexibly suspending the transducer adjacent to such record member for constrained swiveling or rock and roll movement relative thereto.

In present high speed recorder-reproducer systems involving electromagnetic recorders, which are disposed in aerodynamic air bearing relationship relative to recording drums or discs, the high costs involved in providing elaborate gimbal bearings to permit the head to assume a variety of angles of attack intermediate the desired angle of attack yet still not come into contact directly with the drum or disc, have prohibited the use of such gimbal type suspensions. It is desirable, particularly in computer work, where a high speed drum or disc is involved, to accurately position the recorder-reproducer head at a minimum distance from the magnetizable surface of the drum or disc on an aerodynamic film of minimum thickness, so that a fairly high signal level may be obtained during pick-up and so as to produce a highly resolved bit of information when the device is operated in the recording mode.

In the past it has been difficult to obtain the desired result without using rather elaborate mechanical supporting and mounting structures which are quite complex and involve relatively expensive bearings.

It is therefore an important object of the present invention to solve these and other problems in a highly novel, new and heretofore unknown manner.

An additional object of the invention is to provide a suspension construction for a magnetic transducer head which is relatively inexpensive yet which has relatively little play as a result of operational wear even after considerable service.

Another object of the invention is to provide a mounting structure for a magnetic transducer head which includes means to permit very limited movement or operational adjustments in one or more directions at right angles to one another while still maintaining a relatively accurate head to drum spacing gap.

Still another object of the invention is to provide a relatively inexpensive yet high quality suspension which may be simply, quickly, easily and efficiently inserted, removed and adjusted for on-line operation.

In accordance with the foregoing objects and first briefly described, the present apparatus comprises electromagnetic transducer supporting apparatus, e.g., a shoe which may incorporate one or more record-reproducer heads therein and which may, if desired, have the active surface thereof shaped or contoured to conform generally with the configuration of the surface of the record member for example, a drum with which the device is to be used. The shoe carrying head is provided with a tension member which permits maximum freedom of rotation or roll about a horizontal axis (that axis which would be perpendicular to a drum axis if it were used) while still permitting the head to be in tension adjacent the mount to which the tension member is attached. A secondary substantially curvilinear mounting member in the form of a leaf spring provides the force to keep the shoe carrying head in tension with a degree of freedom about the horizontal or roll axis at right angles to the axis of the tension member and includes means for limiting such roll action to avoid any contact with the drum or disc. Further, there is provided a rigid means including a biasing member effective to force the shoe carrying the heads in a direction toward the drum or disc so as to permit the shoe to ride on an aerodynamic film generated between the shoe and the record member as the record member is rotated relative to the shoe thus to cause the shoe assembly to fly or float relative to the record member. This arrangement permits the shoe to partake of a rock and roll or gimbal type movement in directions at right angles to one another while preventing any accidental contact between the shoe and the record medium due to an excessive angular attitude of the head relative to the record member.

These and other objects and advantages of the invention will appear more clearly by referring to the following detailed description when taken in conjunction with the appended claims and accompanying drawings, wherein:

Figures 1, 4:
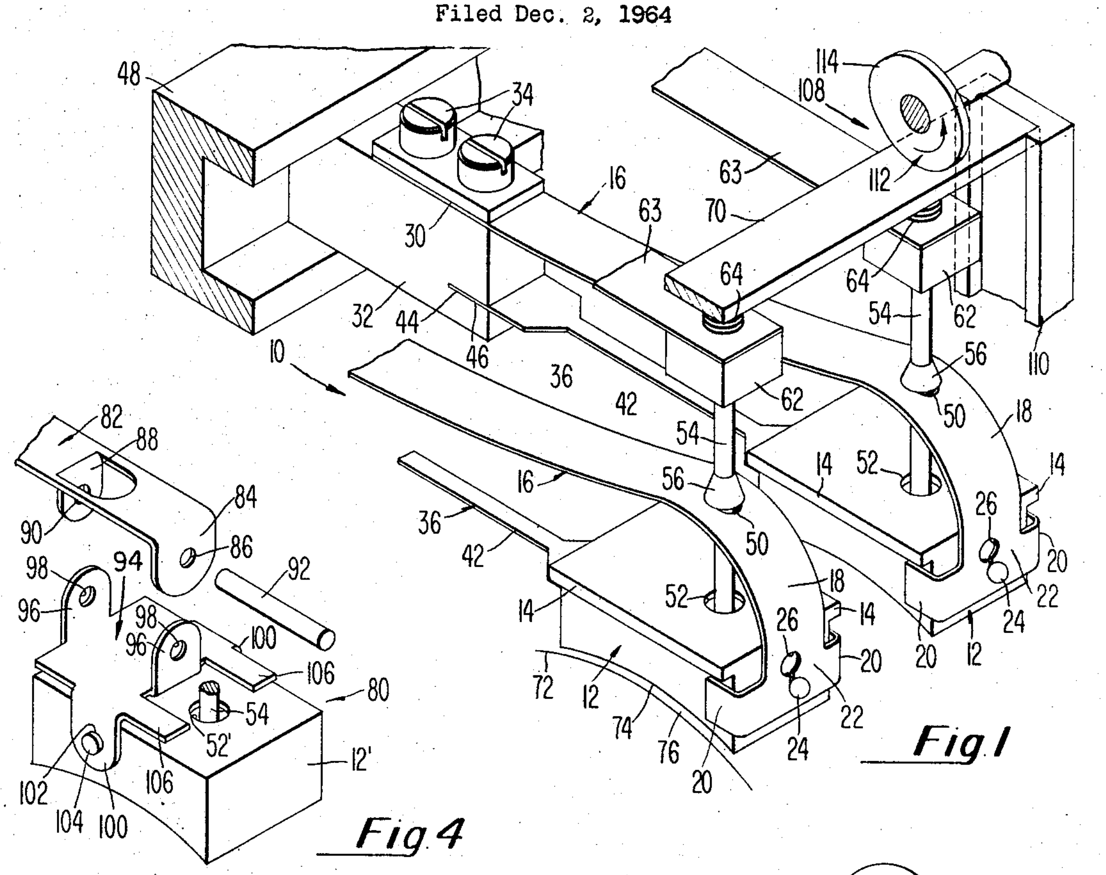
FIGURE 1 is an isometric view of the suspension system involving the present invention.
FIGURE 4 is an additional isometric diagram of a modification of the suspension system of FIGURE 1 involving the present invention.

The suspension system 10 in the embodiment illustrated in FIGURE 1 includes a configured shoe member 12 forming a support and enclosure for one or more recorder-reproducer heads (not shown) and having oppositely disposed overlapping upper ledges 14, for purposes to be explained presently. An elongated substantially curvilinear supporting member in the form of a leaf spring 16, which is arcuately bowed at one end 18, is provided with oppositely disposed forward end tabs 20—20 which project perpendicularly outwardly away from the central portion thereof and backwardly, away from the bent-down end portion 22 of the spring. The members 20—20 provide limit means limiting against the under side of the ledges 14 effective to prevent any over-roll or twist of the transducer 12 as the latter may move about its roll axis. The roll axis is centered about a pin 24 which extends into and through a keyhole opening 26 in spring 16 providing means simply, easily and efficiently to mount and demount the leaf spring to the shoe 12. The opposite end 30 of the spring 16 is or may be secured to a demountable transducer mounting block 32 as by bolts 34.

Figure 2:
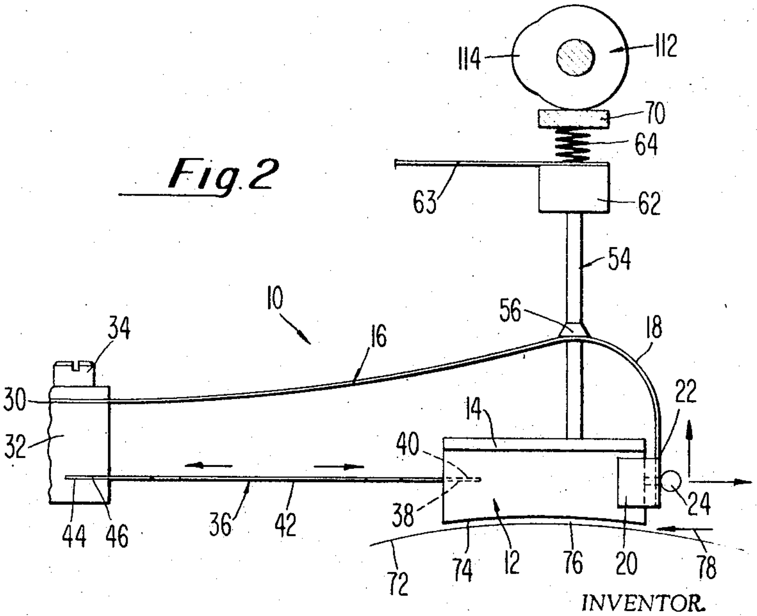
FIGURE 2 is a side elevational view of the suspension system operatively associated with a recording member.

A tension member 36 is or may be demountably attached at one end 38 to the shoe 12 or may be fixedly mounted thereto as by welding, brazing, etc., into a slot 40, FIGURE 2. Member 36 is or may be provided with an intermediate, undercut, narrowed or necked-down portion 42 as shown in FIGURE 1, to reduce weight and so as to permit the transducer to partake of a slight degree of rock or roll about the roll axis, i.e., longitudinally of pin 24. The opposite end 44 is likewise demountably secured in a slot 46 in mounting block 32 in a suitable manner, e.g., as by bolts 34.

This construction is extremely simple yet extremely practical in that the assembly 10 is demountable as a unitary structure and thus can be attached for example, to a guide rail 48 adjacent to the edge of the drum or disc, so that the head may be relatively fixedly mounted with respect to the drum and thereafter adjusted, by means now to be described, so as to bring the latter into aerodynamic conformance with the curved surface of the drum or with the flat planar surface of a disc, as the case may be.

The head structure 10 is adapted to be positioned over the magnetizable surface of the associated record member so as to aerodynamically float or "fly" adjacent to the record member. To aid in initially positioning the transducer toward the recording member by a fixed though variable amount, there is provided an aperture 50 in the spring member 16 and a depression or a seat or depression 52 as described below in the upper surface of the transducer 12. A push rod 54, e.g., an elongated cylindrical rod or bar, is receivable through the aperture 50 in the leaf spring so as to project into a conical depression 55*a* in a jewel bearing 55 located in the recess 52 in the top surface of the transducer shoe 12. A conically shaped protuberance or shoulder 56, intermediate the ends of rod 54, is engageable with the upper arcuate surface of spring 16, adjacent to opening 50, for purposes to be explained shortly.

Figure 3:
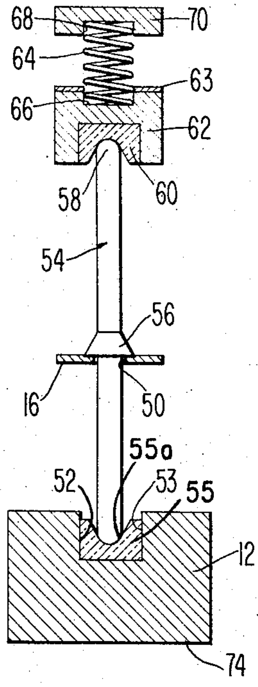
FIGURE 3 is an enlarged detail view of the loading rod and bearings associated therewith.

The upper end 58, FIGURE 3, of push rod 54 is receivable in a jeweled bearing 60 in a loading arm block 62, attached to the forwardly extending end of a flexible support 63. The opposite end of member 63 is secured to the member 48. A pressure spring 64 retained in a circular groove 66 in the block 62, together with a complementing groove 68 in an elongated loading arm 70 provides adjustable pressure against the shoe relative to the drum or disc with which it may be associated.

Where the present invention is to be employed with a rotatable drum 72, the lower or active surface 74 of transducer 12 is or may be arcuately shaped and polished to conform generally though not exactly with the radius of curvature of the drum. This configuration, with the surface 74 at a slightly greater radius than the drum, more efficiently includes the air to become trapped or funneled into the narrow gap 76 between the transducer and the external surface of the recording member in the direction of the arrow 78. It is immediately apparent that if the transducer is to be used with a planar disc, no such arcuate configuration would be utilized.

The foregoing arrangement eliminates any accidental contact between, e.g., an edge of the transducer and the record member. It permits a gradual and increasing stiffening of the suspension as the transducer is brought into a "flying" position. There is a freedom without friction, to roll to a limited extent permitted by the stops 20—20. A constant pitch attitude is provided which avoids front or rear edge touching of the record medium by the transducer. The transducer shoe can be replaced readily by simply releasing the button stop 24 through the keyhole 26 in the leaf spring. The leaf spring is always snubbed to prevent flutter while operating.

FIGURE 4 illustrates a further modification of the structure of FIGURE 1 to include a double gimbal suspension system of a type which provides for complete rock and roll movement about two substantially perpendicular axes and involves less restraint than the structure provided by the arrangement shown in FIGURE 1. The suspension 80 of FIGURE 4 includes a transducer shoe 12′ having one or more recorder-reproducer heads substantially identical to the shoe 12 of FIGURE 1, and may also utilize the push rod construction of FIGURE 1. However, the support means of FIGURE 4 is quite different from that of FIGURE 1, as will now be described.

A single leaf spring 82 is provided at one end with a depending tab 84 bent downwardly, perpendicularly to the longer axis of the spring and an aperture 86 therein. A second tab 88 is stamped or otherwise cut out of the surface of the spring rearwardly of the tab 86 and is likewise bent down at right angles to the main spring axis so as to be parallel with tab 84. An opening or aperture 90 is provided in tab 88 and cooperates with opening 86 to receive a roll axis supporting pin 92, as will now be described. A secondary mounting structure comprising a flat gimbal member 94 having two oppositely disposed upstanding tab-like members 96—96 including complementary axially aligned perforations 98—98 for axial juxtaposition with the perforations 86 and 90 in leaf spring 82. A secondary downwardly projecting pair of oppositely disposed parallel tabs 100—100 (only one of which is plainly visible in FIGURE 4) also provided with apertures 102 therethrough for receiving the pitch axis pin 104, mounts the shoe 12′ to the suspension 80. Gimbal structure 94 is provided with a pair of forwardly projecting parallel tabs 106—106 disposed parallel and spaced apart so as to straddle the depression 52′ in the upper surface of the shoe 12′. The tabs act in the nature of pitch axis limits so that the shoe cannot accidentally pitch forward or rearwardly to cause its edges to contact the surface of the record member thereby to accidentally gouge or dig up or erupt such surface.

Again, as with the structure described in connection with FIGURE 1, a relatively inexpensive stamping or set of stampings may be provided thereby avoiding complex bearing structures. Only two bearing areas being provided, one about the roll axis and the other about the pitch axis. While it is true that these bearings must have little or no play in them, still it is less difficult to provide this type of arrangement than it is to have the conventional and well-known dual ring gimbal which requires rather elaborate bearing and mounting techniques. This structure, as is the case with the structure of FIGURE 1, can be mounted onto a mounting block 32 which in turn can be slidably or otherwise secured to a mounting rail 48 or some other type of base member which is operably associated with the record member in a manner permitting the shoe 12 to be grossly located after which the pressure spring and push rod assembly can juxtapose the lower portion of the shoe adjacent to the upper surface of the drum or disc, as the case may be.

In order that the transducers may be arranged adjacent to the record medium with the least amount of tolerance build-up and physical misorientation due to human operator intervention, a camming structure 108 is employed. Two or more transducers 12 are arranged in side by side, parallel, spaced apart relationship along the mounting rail 48 with the spring retaining flexure member 63 oriented as seen in FIGURE 1 and with the free ends of each of the springs 64 captivated in respective receptacles 66–68 formed in the elongated bar-like loading arm member 70. Member 70 is arranged to extend transversely across the upper portion of the transducers, its opposite ends being received in vertical guide rails 110 located at opposite sides of the headdrum structure. A cam 112 having a camming lobe 114 thereon is rotatably mounted adjacent to the bar 70 so that rotation of the cam causes the lobe 114 to force the bar against the springs effectively pushing the rods 54 vertically downwardly thereby moving each transducer into an operative position adjacent to the record medium. Once the disc or drum is brought up to speed, the transducer 12 is obliged to "fly" or float on a thin film of air constantly passing between the lower surface 74 thereof and the upper peripheral surface of the record medium.

The present invention is a considerable improvement over the known prior art and provides a number of decided advantages including two degrees of freedom for the transducer and shoe under loaded and unloaded conditions. The shoe is kept in tension at all times and is free to rotate about the roll axis to the extent permitted by the limit stops. In the unloaded or free position the push rod is in contact with the jewel bearing at all times so that the push rod always exerts a slight pressure on the shoe even when not "flying." At such times however, the shoulder on the push rod is clear of the leaf spring thereby reducing the tension on the tension link and shoe combination. When located in the "flying" attitude, the shoe, due to its forced position, can assume the ideal approach attitude due to its configuration and its freedom to roll. As added pressure is exerted by the push rod and the tension in the shoe-link is increased due to being forced to flatten out, the shoe spring system becomes stiffer and its adjusted position is more readily attained. Finally, it is observed that at no time during the operation of the invention can the transducer pitch or roll sufficiently to pierce the aerodynamic film and accidentally touch the drum or score the same.

There has thus been described a novel electromagnetic recorder-reproducer suspension system which solves the problems of accurate and efficient alignment and mounting of the head to the record medium in a relatively inexpensive and easy to service structural arrangement.

What is claimed is:

1. Electromagnetic transducer suspension apparatus comprising:

(a) one or more read-record heads, (b) means mounting said heads for operation adjacent to a recording medium such as a tape, disc and drum, (c) a flexible longitudinally extensive, rectilinear member operably associated with said head mounting means permitting the latter means to roll slightly about its longer axis, (d) a flexible longitudinally extensive, curvilinear member operably associated with said head mounting means effectively placing the latter means in tension while permitting the same to rock about the shorter axis thereof the flexible members extending substantially parallel to each other with the curvilinear member terminating adjacent said head mounting means and normal to the long dimension of said rectilinear member, and (e) means for preadjusting said head mounting means into operative electrical transducing relationship with a recording medium with which it may be associated.

2. The invention in accordance with claim 1 wherein said preadjusting means includes means operably engaging said head mounting means and including further means for moving the same toward and away from the recording medium with which it is associated.

3. Electromagnetic transducer suspension apparatus comprising:

(a) one or more read-record heads, (b) means mounting said heads for operative association in hydrodynamic air bearing relationship with a recording medium such as a tape, disc and drum, (c) a demountable, flexible longitudinally extensive, rectilinear, member operably associated with said head mounting means permitting the latter means to roll within fixed limits about its longitudinal axis, (d) a demountable, flexible longitudinally extensive, curvilinear member operably associated with said head mounting means effective to place the latter in tension while permitting the same to rock within fixed limits about the transverse axis thereof the flexible member extending substantially parallel to each other with the curvilinear member terminating adjacent said head mounting means and normal to the long dimension of said rectilinear member, and (e) means biasing said heads toward the recording medium with which they may be associated.

4. The invention in accordance with claim 3 wherein said biasing means includes a push rod engageable with said head mounting means and a spring operably associated therewith effective to load said heads in a direction to effect a transducing relationship between the latter and the record medium with which the transducer may be operably associated.

5. The invention in accordance with claim 3 wherein said biasing means further includes a cam and means operatively associated therewith for moving said head mounting means relative to said record medium.

6. The invention in accordance with claim 3 wherein said biasing means further includes a fixed stop engageable with said curvilinear member for limiting the extension of the latter when the apparatus is in operative condition.

7. Electromagnetic transducer mounting apparatus comprising:

(a) an electromagnetic transducer including one or more read-record heads, said transducer having an operative surface thereof shaped to conform substantially to the surface of the recording medium with which it may be operably associated, (b) a relatively thin, elongated, flexible longitudinally extensive, straight-line member operably associated with said transducer permitting the latter a degree of freedom about the longitudinal axis thereof, (c) a thin, elongated, flexible longitudinally extensive, substantially curvilinear member including means demountably securing the same to said transducer effective to place the same in tension and permitting the latter a degree of freedom within limits about the transverse axis thereof the flexible members extending substantially parallel to each other with the curvilinear member terminating adjacent said head mounting means and normal to the long dimension of said rectilinear member, and (d) adjustable biasing means operably associated with said transducer and engageable therewith adjacent to and displaced slightly from the center thereof effective to place said transducer in an angular orientation relative to the recording medium with which it is operatively associated thereby to cause the transducer to float upon a thin film of air as a result of relative movement between said recording medium and said transducer when said recording medium is moved.

8. The invention in accordance with claim 7 wherein said demountable securing means includes a keyhole shaped aperture in said curvilinear member and a pin on said transducer for removable reception within said aperture.

9. Electromagnetic transducer mounting apparatus comprising:

(a) a plurality of electromagnetic transducers each carrying one or more read-record heads, (b) means demountably mounting said transducers in side by side parallel arrangement permitting the same to be inserted and removed at will and wherein the transducers may be stacked adjacent one another in a row, (c) means operably associated with said mounting means and said transducers permitting the latter a limited degree of freedom to roll slightly about the longitudinal axes thereof, (d) means operably associated with said mounting means and said transducers effectively placing the transducers in tension while permitting a limited degree of freedom of movement about the transverse axes thereof, (e) means operatively associated with each of said transducers for biasing the same toward an associated recording medium, and (f) means associated with each biasing means for simultaneously effecting the movement of all of said transducers in a direction to bring the transducers into operative electromagnetic transducing relationship with said recording medium.

10. The invention in accordance with claim 9 wherein said last named means includes a rigid, elongated member spanning all of said transducers and including a rotatable cam member operatively associated therewith in a manner to effect movement of the transducers into air bearing transducing association with said recording medium when said cam is rotated.

11. Electromagnetic transducer suspension apparatus comprising:

(a) one or more recorder-reproducer heads, (b) means mounting said heads for operative association in aerodynamic air bearing relationship with a recording medium with which said heads may be operably associated, (c) a demountable, flexible, rectilinear member operably associated with said head mounting means permitting the latter to roll with fixed limits abount its longitudinal axis, (d) a demountable substantially flat member operatively associated with said rectilinear member and said head mounting means and including opposite parallel stop members permitting said heads a degree of freedom of movement within the limits of said stop members about the transverse axis thereof, and (e) means for adjustably biasing said head mounting means in a direction toward the recording medium with which said latter means may be associated.

12. Electromagnetic transducer mounting apparatus comprising:

(a) an electromagnetic transducer including one or more recorder-reproducer heads, said transducer having an operative surface thereof shaped to conform substantially to the surface of the recording medium with which it may be operatively associated, (b) a relatively thin, elongated, flexible, straight-line member operably associated with said transducer permitting a degree of movement about the longitudinal axis thereof and including parallel supporting extensions thereon for providing attachment means therefor, (c) a gimbal member including means adapted to straddle said transducer and support the same permitting the latter a degree of freedom within limits about the transverse axis thereof and having associated suspension members for operable engagement with the supporting extensions of said straight-line member so that the two members may be coupled together for rock and roll movement of said transducer thereabout, and (d) adjustable biasing means operably associated with said transducer and engageable therewith adjacent to and slightly displaced from the center thereof effective thereby to place said transducer in an angular orientation relative to a recording medium to permit the transducer to fly upon a thin film of air as a result of relative movement between said recording medium and said transducer when said recording medium is moved.

References Cited

UNITED STATES PATENTS

| | | | |
|---|---|---|---|
| 3,039,102 | 6/1962 | Fueller et al. | 179—100.2 |
| 3,124,660 | 4/1964 | Criner | 179—100.2 |
| 3,197,751 | 7/1965 | Felts | 179—100.2 |
| 3,245,063 | 4/1966 | Cheney et al. | 340—174.1 |
| 3,308,450 | 3/1967 | Bourdon et al. | 179—100.2 |
| 3,310,792 | 3/1967 | Groom et al. | 340—174.1 |

BERNARD KONICK, *Primary Examiner.*

V. P. CANNEY, *Assistant Examiner.*